(12) United States Patent
Shields et al.

(10) Patent No.: US 7,318,073 B2
(45) Date of Patent: Jan. 8, 2008

(54) SYSTEM AND METHOD FOR DOWNLOADING INFORMATION TO A MOBILE DEVICE

(75) Inventors: Kevin T. Shields, Bellevue, WA (US); Steven A. Cover, Redmond, WA (US); Chad M. Whitney, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 10/159,237

(22) Filed: May 31, 2002

(65) Prior Publication Data

US 2003/0225797 A1    Dec. 4, 2003

(51) Int. Cl.
*G06F 17/30* (2006.01)
(52) U.S. Cl. .................... 707/202; 707/1; 707/10; 707/200
(58) Field of Classification Search ........... 707/1–3, 707/10, 201, 202, 4, 5, 100, 102, 103 R; 709/206, 216, 227, 228, 229, 236, 219; 370/356; 455/412.1; 715/500, 531; 705/14, 26
See application file for complete search history.

(56) References Cited

U.S. PATENT DOCUMENTS

| | | | | |
|---|---|---|---|---|
| 6,052,735 | A * | 4/2000 | Ulrich et al. | 709/236 |
| 6,122,639 | A * | 9/2000 | Babu et al. | 707/103 R |
| 6,272,545 | B1 * | 8/2001 | Flanagin et al. | 709/228 |
| 6,363,140 | B1 | 3/2002 | Pinard | 379/88.22 |
| 6,421,717 | B1 * | 7/2002 | Kloba et al. | 709/219 |
| 6,438,585 | B2 * | 8/2002 | Mousseau et al. | 709/206 |
| 6,442,595 | B1 * | 8/2002 | Kelly | 709/206 |
| 6,785,712 | B1 * | 8/2004 | Hogan et al. | 709/206 |
| 2002/0023136 | A1 * | 2/2002 | Silver et al. | 709/206 |
| 2002/0052916 | A1 | 5/2002 | Kloba et al. | 709/203 |

FOREIGN PATENT DOCUMENTS

| | | | |
|---|---|---|---|
| DE | 199 56 023 A1 | | 4/2001 |
| GB | 2 358 768 A | | 8/2001 |
| WO | WO 9922305 | * | 5/1999 |

OTHER PUBLICATIONS

Goel, Siddhartha K. et al., "Efficient Peer-to_Peer Data Dissemination in Mobile Ad-Hoc Networks", Proceedings of the International Conference on Parallel Processing Workshopws (ICPPW'02), 2002, pp. 152-158.

* cited by examiner

*Primary Examiner*—Shahid Alam
*Assistant Examiner*—Fred I Ehichioya
(74) *Attorney, Agent, or Firm*—Merchant & Gould P.C.; Ryan T. Grace (57) ABSTRACT

Described is a method and system for downloading information to a mobile device. The system and method provide a mechanism for selectively identifying the type of information that can be downloaded to the mobile device. In one embodiment, the mechanism includes a user interface resident on the mobile device that allows user selection of the type of information. Alternatively, the mechanism includes a profile maintained on a server. The profile identifies the type of information, such as a file extension, that a particular mobile device supports. In addition, the type of information may be based on a file size associated with the information. Once the type of information is identified, the server downloads the identified type of information to the mobile device without downloading undesired types of information. Thus, the synchronization session is efficiently managed so that undesired information is not downloaded to the mobile device.

20 Claims, 7 Drawing Sheets

| PROFILE | | | |
|---|---|---|---|
| DEVICE NAME | DEVICE TYPE | SUPPORTED FILE TYPES | OTHER |
| SCAVER | POCKETPC 2.0 | .TXT | <5MB |
| SCAVER | SMARTPHONE | .PPT, .XLS, .DOC | <16MB |
| 2000-0010-12 | MODEL 2000 | .TXT, .HTML, .PPT | |
| 003-56-ESCK | POCKETPC 2.0 | .TXT, .DOC | |

SYSTEM AND METHOD FOR DOWNLOADING INFORMATION TO A MOBILE DEVICE

BACKGROUND OF THE INVENTION

Today, there a variety of mobile devices that are designed to keep a user updated with current information. For example, there are personal digital assistants, wireless phones, email devices, and the like. While each of these mobile devices may offer somewhat unique information, each of the mobile devices need to synchronize their information at some time with a fixed device (i.e., a synchronization server). The process for updating information is commonly referred to as a synchronization session.

The information that is synchronized may include emails, attachments to emails, web page content, and the like. The information varies in size. For example, some attachments may be quite large (e.g., 2 Mbytes). Thus, during the synchronization session, the large attachment is downloaded over a wireless connection to the mobile device. However, downloading large attachments over a wireless connection may be very expensive and time-consuming. The mobile device incurs a usage charge for the total time that the mobile device is synchronizing with the fixed device over the wireless network. A typical synchronization session may take several minutes. Therefore, there is a need for a mechanism that minimizes the duration of the synchronization session.

SUMMARY OF THE INVENTION

The present invention is directed at an efficient system and method for downloading information to a mobile device. Briefly stated, the system and method provide a mechanism for selectively identifying the type of information that can be downloaded to the mobile device. In one embodiment, the mechanism includes a user interface resident on the mobile device that allows user selection of the type of information. In another embodiment, the mechanism includes a profile maintained on a server. The profile identifies the type of information, such as file types, that a particular mobile device supports. As a further refinement, the type of information may be based on a file size associated with the information. Once the type of information is identified, the server downloads the identified type of information to the mobile device without downloading undesired types of information. Thus, in accordance with the present invention, the synchronization session of the mobile device is efficiently managed so that undesired information is not downloaded to the mobile device.

DETAILED DESCRIPTION OF THE PREFERRED EMBODIMENT

Briefly stated, the present invention is directed at efficiently downloading information of interest to a mobile device. The information of interest may be based on file types supported by the mobile device, the amount of storage available on the mobile device, and the like. These and other aspects of the invention will become apparent to those skilled in the art after reading the following detailed description.

Illustrative Operating Environment

Figure 1:
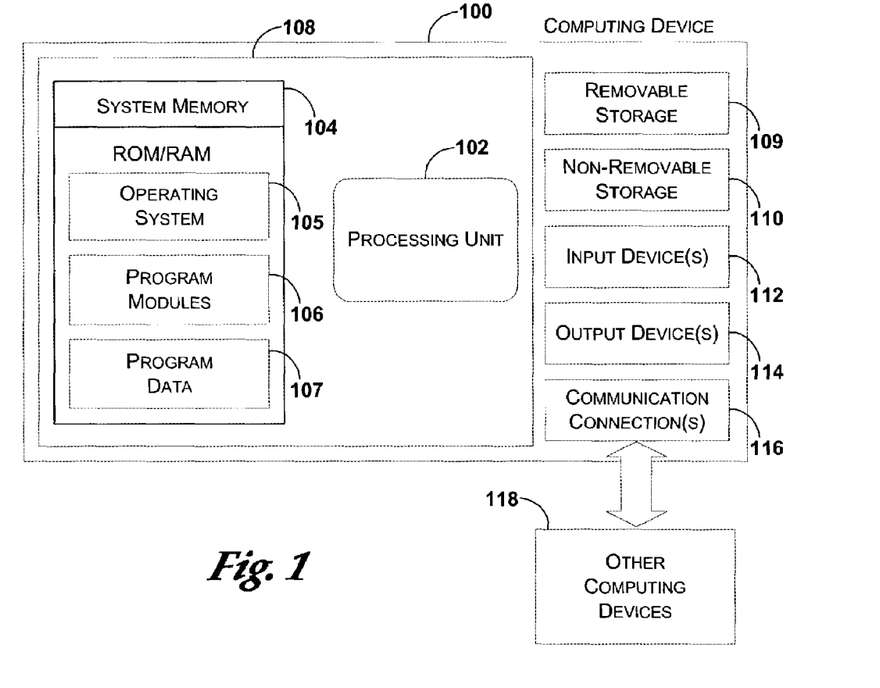
FIG. 1 illustrates an exemplary computing device that may be used in one exemplary embodiment of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
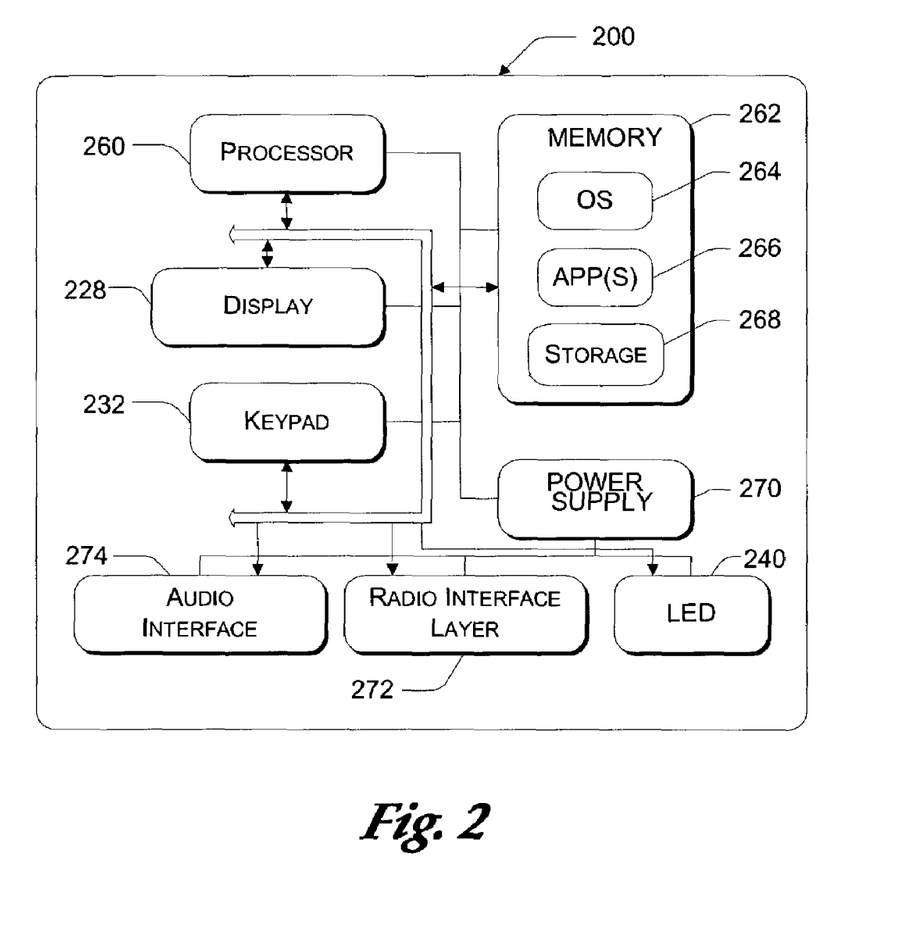
FIG. 2 illustrates an exemplary mobile device that may be used in one exemplary embodiment of the present invention.

With reference to FIG. 2, one exemplary system for implementing the invention includes a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. The mobile computing device 200 also includes nonvolatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing program, and the like.

The mobile computing device 200 has a power supply 270, which may be implemented as one or more batteries. The power supply 270 might further include an external power source, such as an AC adapter or a powered docking cradle, that supplements or recharges the batteries.

The mobile computing device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Illustrative Synchronization System

Figure 3:
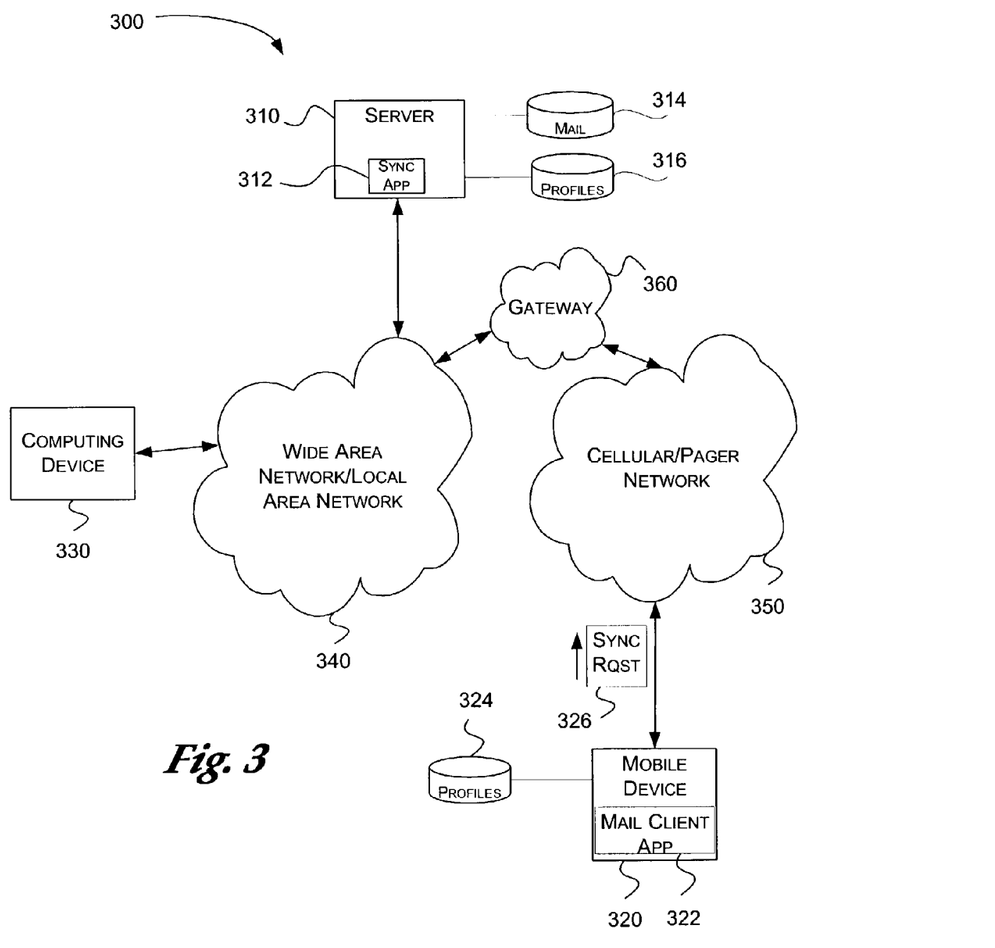
FIG. 3 is a functional block diagram of an exemplary synchronization system as implemented using the computing device shown in FIG. 1 and the mobile device shown in FIG. 2.

FIG. 3 is a functional block diagram generally illustrating a synchronization system 300 for downloading information from a server 310 to a mobile device 320. The server 310 is a computing device such as the one described above in conjunction with FIG. 1, and the mobile device 320 is a mobile computing device such as the one described above in conjunction with FIG. 2.

In one embodiment of the present invention, server 310 is configured as a shared server running a synchronization application 312. The synchronization application 312 is configured to maintain a mail database 314. Mail database 314 stores messages addressed to a user associated with mobile device 320. Any computing device, such as computing device 330, may send an email message addressed to the user associated with mobile device 320. The email message is transmitted over a wide area network (WAN)/local area network (LAN) 340. One example of a WAN is the Internet that connects millions of computers over a host of gateways, routers, switches, hubs, and the like. An example of a LAN is a network used to connect computers in a single office. A WAN may connect multiple LANs. The email message is then stored in mail database 314. The email message may include one or more attachments, which may also be transmitted to server 310 and stored in mail database 314. The transmission of email messages over network 340 is well known in the art and is not discussed at length here.

The email messages that are stored in mail database 314 are accessed when mobile device 320 initiates a synchronization session. Briefly, the synchronization session, described in detail later in conjunction with FIGS. 4-5, accesses the stored email messages and determines which of the stored email messages should be sent to mobile device 320. Those skilled in the art will appreciate that there may be several mobile devices associated with one user. For example, the user may have a personal digital assistant, a cellular phone, an email device, and the like. The user may use any one of these mobile devices to access the stored email messages. In one embodiment, the server 310 maintains a profile database 316 with data on each type of mobile device. In another embodiment, the mobile device 320 maintains a client profile 324. Briefly, the profile database 316 and the client profile 324 identify information of interest to the mobile device, such as supported file types. As will be described in detail below, the information of interest will eventually be downloaded to the mobile device without downloading undesired information.

Thus, from any one of the user's mobile devices (e.g., mobile device 320), the user may initiate a synchronization session and access mail database 314. A client mail application 322 residing on the mobile device 320 is configured to initiate the synchronization session (e.g., synchronization request 326) and to communicate with the synchronization application 312 on server 310. The client application 322 and the synchronization application 312 may communicate using any one of several client-server protocols. For the following discussion, the Internet Message Access Protocol (IMAP) is described as the client-server protocol. However, those skilled in the art will appreciate that the present invention can be utilized with other client-server protocols (e.g., Internet's Post Office Protocol (POP)) without undue experimentation.

Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send an email that is addressed to a cellular phone. Gateway 360 provides a means for transporting the email from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

Figure 4:
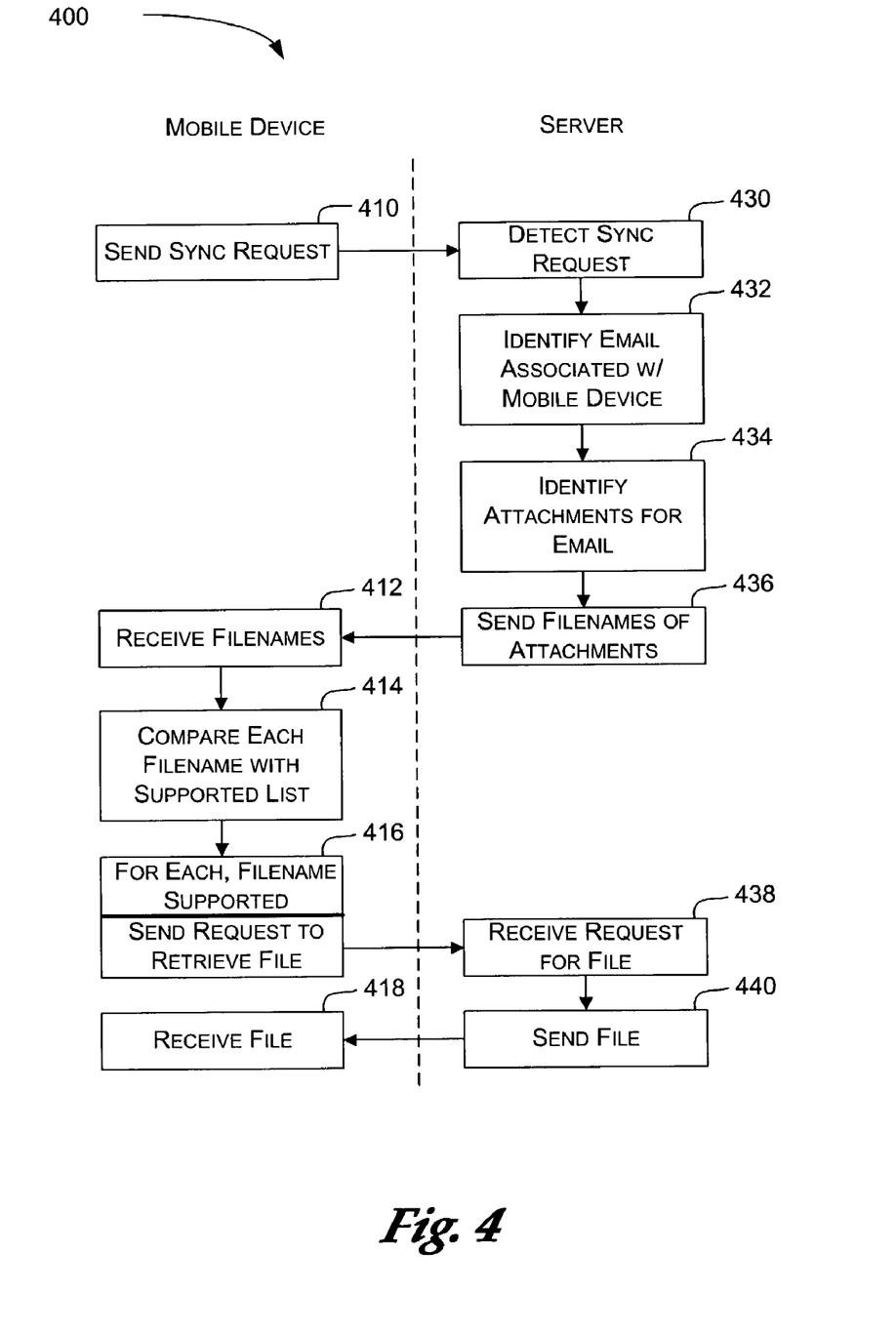
FIG. 4 is a sequence flow diagram illustrating a synchronization process between the mobile device shown in FIG. 2 and the computing device shown in FIG. 1, in accordance with one embodiment of the present invention.

FIG. 4 is a sequence flow diagram illustrating a synchronization process between the mobile device shown in FIG. 2 and the computing device shown in FIG. 1, in accordance with one embodiment of the present invention. The processing performed by the client mail application 322 residing on mobile device 320 is shown on the left side of the diagram and the processing performed by the synchronization application 312 on the server 310 is shown on the right side of the diagram. The process 400 begins when an input on the mobile device triggers a synchronization session, such as depressing a key or the like. Processing begins at block 410.

At block 410, the client email application sends a synchronization request. The synchronization request is sent using a conventional email protocol, such as Internet Message Access Protocol (IMAP). As such, the synchronization request identifies the user associated with the mobile device. In addition, the synchronization request specifies that the server send header files associated with the email messages, rather than the complete email message. Processing continues at block 430.

At block 430, the synchronization application on the server detects the synchronization request. During the detection, the synchronization application reads the synchronization request and identifies the user associated with the mobile device that is initiating the synchronization request. Processing continues at block 432.

At block 432, based on the user identified in block 430, the synchronization application identifies email messages associated with that user that are stored in the email database on the server. Processing continues at block 434.

At block 434, the synchronization application identifies attachments associated with the email messages identified in block 432. In accordance with the present invention, these attachments will be selectively downloaded to the mobile device in order to more efficiently synchronize the mobile device with the fixed device. Processing continues at block 436.

At block 436, the filenames of the attachments identified in block 434 are sent to the mobile device. Processing continues at block 412.

At block 412, the mobile device receives the filenames of the attachments. As briefly mentioned above, the communication exchange between the synchronization application and the client mail application utilizes IMAP in this embodiment of the present invention. As one skilled in the art will appreciate, IMAP allows a client application to specify the type of information it expects to have the server return. Thus, the present invention does not require a new Internet mail protocol, but rather, utilizes an existing Internet mail protocol to achieve the goals of the present invention. Processing continues at block 414.

At block 414, each file name received in block 412 is compared with a list of supported files in accordance with the present invention. As mentioned above, one problem with having a variety of mobile devices available to users is that each mobile device supports different functionality. However, during conventional synchronization sessions, the server typically downloads the same information to each type of mobile device. Therefore, some information that is downloaded to one type of mobile device may not be usable on that type of mobile device or may not otherwise be useful to the user on that type of mobile device. Thus, the synchronization session has wasted the user's time in downloading the useless information. In addition, the synchronization session has wasted memory on the mobile device with useless information. The present invention alleviates this waste of time and memory by providing a selection mechanism for specifying files of interest. These files of interest are files that the user may want to use on the mobile device or are files that the mobile device currently supports.

Figure 7:
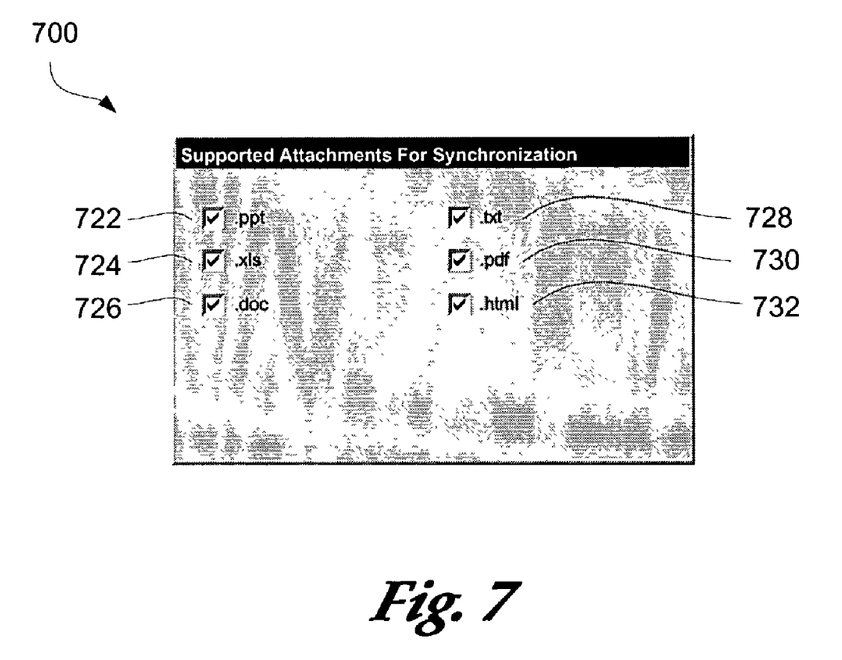
FIG. 7 is an illustrative screen shot of a user-interface that may be presented on the mobile device shown in FIG. 2, in accordance with one implementation of the invention.

In one embodiment, the selection mechanism includes a user interface on the mobile device. Turning briefly to FIG. 7, an illustrative screen shot of a user-interface is shown that may be presented on the mobile device. The user-interface includes conventional user-interface objects, such as a window 700 and one or more checkboxes 722-732. In accordance with the present invention, each checkbox (e.g., 722) is associated with a specific file type (e.g., .doc) that the mobile device supports. In another embodiment, the selection mechanism includes a client profile that is stored on the mobile device. Briefly, the client profile lists the supported files. The client profile may be provided by the manufacture when the mobile device is purchased and may be modified in a manner well known to those skilled in the art, such as downloading an upgraded client profile, editing the client profile, or the like. In addition, the client profile may exist as an entry in a registry on the mobile device.

Returning to FIG. 4, after each filename is compared with the list of supported files, processing continues at block 416. At block 416, for each file that is supported, a request is sent to the server to retrieve the associated attachment. As will be appreciated, the request may identify any number of attachments to retrieve. Therefore, it is not necessary that each attachment have a separate request. The request may be a FETCH request that is well known to those in the art. Processing continues at block 438.

At block 438, the synchronization application receives the request for the attachments. Based on this request, the synchronization sends the file or files to the mobile device at block 440. Processing continues at block 418.

At block 418, the client mail application receives the file. Therefore, in the above-described embodiment, the client mail application determines which files the server should download to the mobile device. Thus, the mobile device does not receive any files that are useless to the mobile device, such as files that do not have a corresponding application loaded in the mobile device. Processing is then complete.

Figure 5:
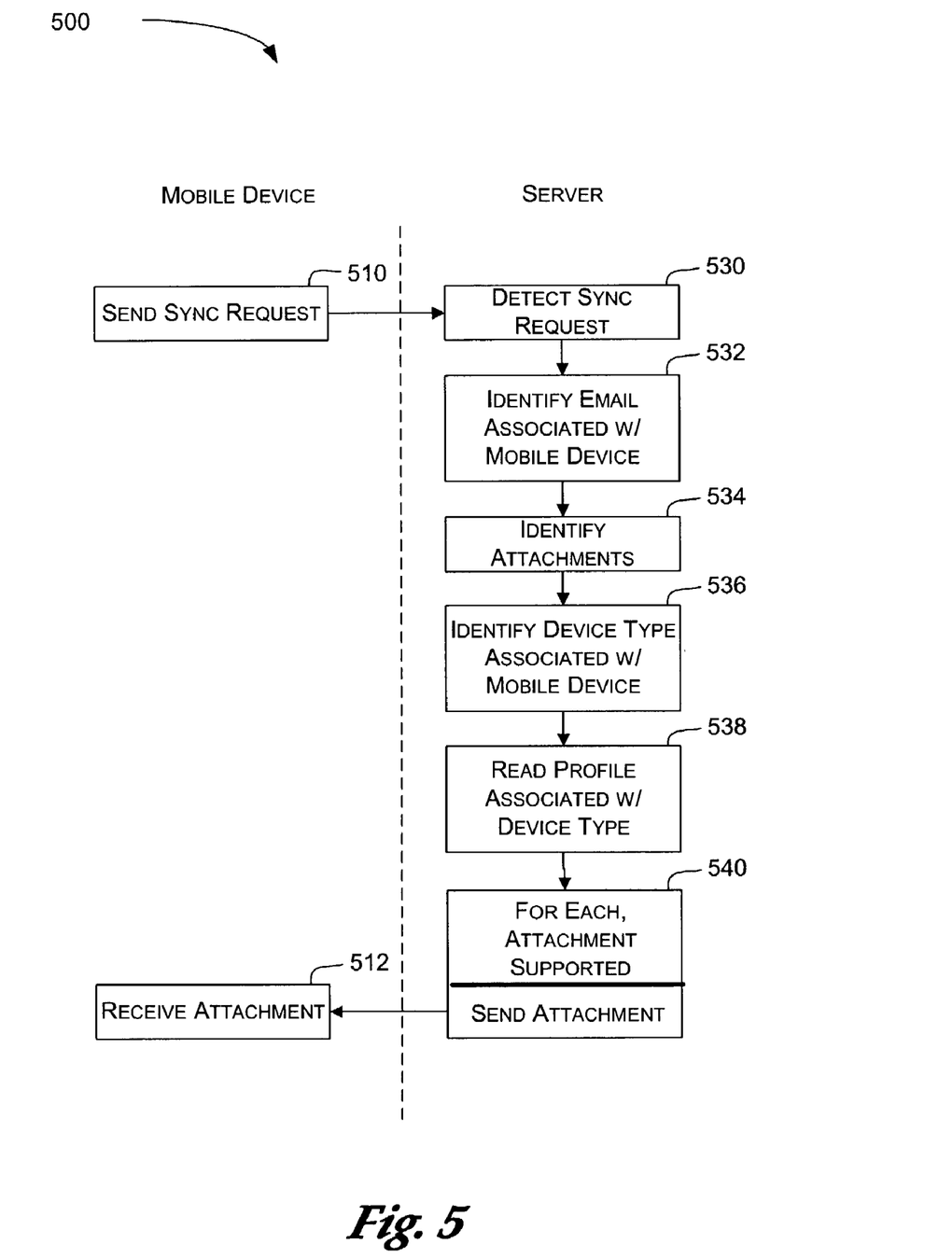
FIG. 5 is a sequence flow diagram illustrating another synchronization process between the mobile device shown in FIG. 2 and the computing device shown in FIG. 1, in accordance with another embodiment of the present invention.

FIG. 5 is a sequence flow diagram illustrating another synchronization process between the mobile device shown in FIG. 2 and the computing device shown in FIG. 1, in accordance with another embodiment of the present invention. In this embodiment, the synchronization application is configured to filter the files before downloading to the mobile device. Again, the processing performed by the client mail application 322 residing on the mobile device 320 is shown on the left side of the diagram and the processing performed by the synchronization application 312 on the server 310 is shown on the right side of the diagram. The process 500 begins when an input on the mobile device triggers a synchronization session. Processing begins at block 510.

At block 510, the client email application sends a synchronization request. Again, the synchronization request identifies the user associated with the mobile device. However, in this embodiment, the synchronization request also includes a device type identifier. The device type identifier specifies the type of device (e.g., a SMARTPHONE device) that is initiating the synchronization session. The synchronization application will use the device type identifier during its processing. Processing continues at block 530.

At block 530, the synchronization application on the server detects the synchronization request. During the detection, the synchronization application reads the synchronization request and identifies the user associated with the mobile device that is initiating the synchronization session. Processing continues at block 532.

At block 532, based on the user identified in block 530, the synchronization application identifies email messages associated with that user that are stored in the email database on the server. Processing continues at block 534.

At block 534, the synchronization application identifies attachments associated with the email messages identified in block 532. In accordance with the present invention, these attachments will be selectively downloaded to the mobile device in order to more efficiently synchronize the mobile device with the fixed device. Processing continues at block 536.

At block 536, the synchronization application determines the device type associated with the mobile device. The device type is determined based on information in the synchronization request. Processing continues at block 538.

At block 538, the synchronization application reads a profile associated with the device type identified at block 536. In general, the profile is used to determine which attachments should be downloaded to the mobile device. In one embodiment the profile may be stored on the server in the profile database. In this embodiment, the profile may be updated using conventional methods for updating a database. In another embodiment, the profile may be included within the synchronization request. In still another embodiment, the server may request the profile from the mobile device if the server does not have the profile in the profile database. The profile may be associated with a particular user, a particular session, a specific device, or the like. For example, one user may be associated with a wireless device, a paging device, and a personal digital assistant.

Figure 6:
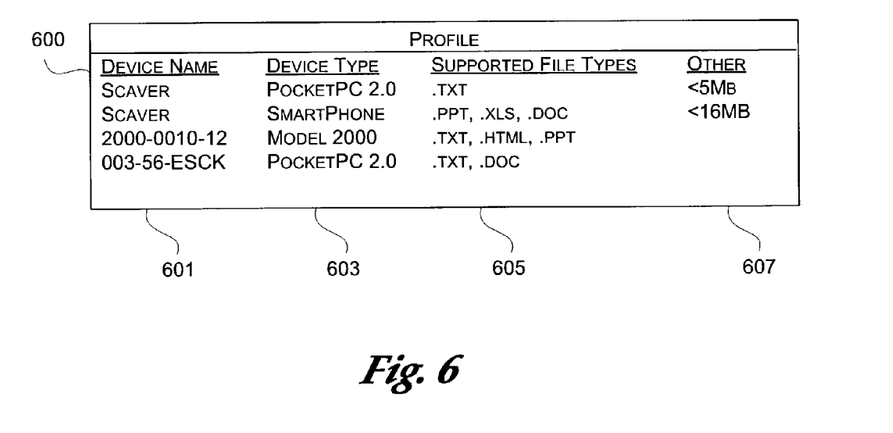
FIG. 6 is a graphical representation generally illustrating the salient portions of a profile suitable for use during the synchronization process of FIG. 4 and FIG. 5.

Turning briefly to FIG. 6, a graphical representation illustrating the salient portions of an exemplary profile 600 is shown. In the exemplary profile 600, there are four columns of information: a device name column 601, a device type column 603, a supported file column 605, and other column 607. The device name column 601 identifies a user name associated with the mobile device or may include an identifier for the mobile device, such as a serial number supplied by the manufacture. The device type column 603 identifies a model number for the mobile device. The supported file column 605 identifies the file types supported on the corresponding mobile device. Because each device type offers differing functionality, the list of supported file types will typically vary between device types. The other column 607 lists other criterion for determining whether to download a file, such as the size of the file (e.g., >16 MB). If the memory in the mobile device is presently near capacity, the user may wish to refrain from downloading large files.

Returning back to FIG. 5, at block 540, each attachment is compared with the profile to determine whether the attachment is supported on the mobile device. For each attachment that is supported, the attachment is sent to the mobile device. Processing continues at block 512, where the client email application receives the attachment. Processing is then complete.

While the above embodiments focus on filtering email attachments, one skilled in the art will appreciate that other information may likewise be selectively downloaded in accordance with the present invention. In addition, the selection may be based on a variety of criterion, such as a document author, a date, and the like. Thus, in accordance with the present invention, the mobile user may customize each of their mobile devices with information of interest for that particular mobile device while still using the same database or store of information for all mobile devices.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for downloading information between a mobile device and a server, the method comprising:

detecting a download request, wherein the download request includes a user identification and a device type identifier, wherein the device type identifier identifies a type of mobile device associated with the download request;

identifying email messages associated with the user identification;

identifying attachments associated with the identified email messages;

determining a device type associated with the device type identifier;

accessing a profile associated with the determined device type, wherein the profile includes file types that are supported by the device type identified by the device type identifier;

determining at least one supported file type from the profile;

identifying attachments of the identified email messages that include the at least one supported file type that is supported by the device type identified by the device type identifier; and downloading attachments that include the at least one supported file type supported by the device type identified by the device type identifier, while attachments that do not include the at least one supported file type supported by the device type identified by the device type identifier are not downloaded.

2. The computer-implemented method of claim 1, wherein the at least one file type is based on a file extension.

3. The computer-implemented method of claim 1, wherein the at least one file type corresponds to an application on the mobile device.

4. The computer-implemented method of claim 1, wherein the at least one file type is based on a file size.

5. The computer-implemented method of claim 1, wherein the server requests the profile from the mobile device and the mobile device sends the profile to the server.

6. The computer-implemented method of claim 1, wherein the profile includes a list of supported file types for the device type.

7. The computer-implemented method of claim 1, wherein the profile resides on the server.

8. The computer-implemented method of claim 1, wherein the profile resides on the mobile device.

9. The computer-implemented method of claim 1, wherein the profile is transmitted to the server from the mobile device during a synchronization session.

10. A computer storage media having computer-executable instructions for downloading information between a mobile device and a server, the instructions comprising:
    detecting a download request, wherein the download request includes a user identification and a device type identifier, wherein the device type identifier identifies a type of mobile device associated with the download request;
    identifying email messages associated with the user identification;
    identifying attachments associated with the identified email messages;
    determining a device type associated with the device type identifier;
    accessing a profile, wherein the profile includes a plurality of device types and file types that are supported by the plurality of device types, wherein the profile is accessible to associate the device type identified by the device type identifier with file types that are supported by the device type;
    determining at least one supported file type from the profile;
    identifying attachments of the identified email messages that include the at least one supported file type that is supported by the device type identified by the device type identifier; and
    downloading attachments that include the at least one supported file type supported by the device type identified by the device type identifier, while attachments that do not include the at least one supported file type supported by the device type identified by the device type identifier are not downloaded.

11. The computer storage media of claim 10, wherein the at least one file type is based on at least one of: a file extension, an application on the mobile device, and a file size.

12. The computer storage media of claim 10, wherein the server requests the profile from the mobile device and the mobile device sends the profile to the server.

13. The computer storage media of claim 10, wherein the profile includes a list of supported file types for the device type.

14. The computer storage media method of claim 10, wherein the profile resides on at least one of: the server, and the mobile device.

15. The computer storage media of claim 10, wherein the profile is transmitted to the server from the mobile device during a synchronization session.

16. A system for downloading information to mobile device, the system comprising:
    a synchronization server executing to:
        detect a download request, wherein the download request includes a user identification and a device type identifier, wherein the device type identifier identifies a type of mobile device associated with the download request;
        identify email messages associated with the user identification;
        identify attachments associated with the identified email messages;
        determine a device type associated with the device type identifier by accessing a profile, wherein the profile is accessible to associate the device type identified by the device type identifier with file types that are supported by the device type;
        determine at least one supported file type from the profile;
        identify attachments of the identified email messages that include the at least one supported file type that is supported by the device type identified by the device type identifier; and
        download attachments that include the at least one supported file type supported by the device type identified by the device type identifier, while attachments that do not include the at least one supported file type supported by the device type identified by the device type identifier are not downloaded.

17. The system of claim 16, wherein the at least one file type is based on at least one of: a file extension, an application on the mobile device, and a file size.

18. The system of claim 16, wherein the server requests the profile from the mobile device and the mobile device sends the profile to the server.

19. The system of claim 16, wherein the profile includes a list of supported file types for the device type.

20. The system of claim 16, wherein the profile is transmitted to the server from the mobile device during a synchronization session.

* * * * *